United States Patent
Wijetunge et al.

(10) Patent No.: US 9,867,211 B2
(45) Date of Patent: Jan. 9, 2018

(54) METHOD AND COMMUNICATION APPARATUS FOR ACQUIRING SCHEDULING INFORMATION OF NEIGHBOURING CELL BASE STATION

(71) Applicant: Cellos Software Ltd., Melbourne (AU)

(72) Inventors: Sumudu Prasad Wijetunge, Berwick (AU); Leon Gor, Sunshine (AU); Md Anisul Karim, Clayton (AU)

(73) Assignee: Cellos Software Ltd., Melbourne (AU)

(*) Notice: Subject to any disclaimer, the term of this patent is extended or adjusted under 35 U.S.C. 154(b) by 72 days.

(21) Appl. No.: 15/140,061

(22) Filed: Apr. 27, 2016

(65) Prior Publication Data

US 2017/0318605 A1 Nov. 2, 2017

(51) Int. Cl.
| | | |
|---|---|---|
| H04W 72/12 | (2009.01) | |
| H04W 72/04 | (2009.01) | |
| H04W 74/04 | (2009.01) | |
| H04W 16/32 | (2009.01) | |
| H04L 5/14 | (2006.01) | |

(52) U.S. Cl.
CPC .......... *H04W 72/1289* (2013.01); *H04L 5/14* (2013.01); *H04W 16/32* (2013.01); *H04W 72/042* (2013.01); *H04W 72/1205* (2013.01); *H04W 74/04* (2013.01)

(58) Field of Classification Search
CPC . H04W 48/12; H04W 52/32; H04W 72/1289; H04W 74/00; H04W 74/006; H04W 74/002; H04W 74/04; H04W 72/12; H04W 72/1205; H04W 72/1263; H04W 72/1278; H04L 1/0047
See application file for complete search history.

(56) References Cited

U.S. PATENT DOCUMENTS

| | | | | |
|---|---|---|---|---|
| 2014/0036747 | A1* | 2/2014 | Nory | H04W 72/0406 370/311 |
| 2014/0086173 | A1* | 3/2014 | Sadeghi | H04L 5/005 370/329 |
| 2014/0301343 | A1* | 10/2014 | Park | H04L 5/0055 370/329 |
| 2014/0328295 | A1* | 11/2014 | Ko | H04L 5/0053 370/329 |
| 2015/0156764 | A1* | 6/2015 | Yang | H04L 1/0076 370/329 |
| 2015/0296542 | A1* | 10/2015 | Heo | H04W 74/0833 370/329 |

* cited by examiner

*Primary Examiner* — Ashley Shivers
(74) *Attorney, Agent, or Firm* — Shumaker, Loop & Kendrick, LLP

(57) ABSTRACT

The present disclosure relates to methods and a communication apparatus for acquiring scheduling information of neighboring cell eNodeBs in a wireless communication network.

28 Claims, 12 Drawing Sheets

METHOD AND COMMUNICATION APPARATUS FOR ACQUIRING SCHEDULING INFORMATION OF NEIGHBOURING CELL BASE STATION

FIELD

The present disclosure relates to methods and a communication apparatus for acquiring scheduling information of neighbouring cell eNodeBs in a wireless communication network. In particular, the present disclosure provides a communication apparatus and methods for efficiently and accurately acquiring scheduling information assigned to user devices by neighbouring cell eNodeBs in a wireless communication network by using intelligently selected random network temporary identifier(s) to decode search space(s) of the physical downlink control channel message transmitted by neighbouring cell eNodeBs in order to acquire scheduling information assigned to one or more user devices within a radio service coverage of the neighbouring cell eNodeBs.

BACKGROUND

Heterogeneous Networks (HetNets) are wireless communication networks with a multi-layered architecture of different cell sizes. In a HetNet, the overlaid small cells coexist in the same geographical area with macro cells potentially sharing the same spectrum with the macro cells. When all heterogeneous nodes share the same spectrum, two kinds of interference appear:

Cross-tier interference: The aggressor (e.g., a small cell) and the victim of interference (e.g., a user equipment (UE) currently served by the macro cell base station) belong to different tiers.

Intra-tier interference: The aggressor (e.g., a small cell) and the victim (e.g., a neighbouring small cell UE) belong to the same tier.

In the HetNet, efficient spectrum utilisation in small cells should be employed in order to minimize interference to the macro cell eNodeB from small cell eNodeB. As a result, the small cell eNodeBs can harmoniously operate with the macro cell eNodeBs to deliver improved system throughput and quality of service compared to the network without small cell eNodeBs. To enable effective interference mitigation, the small cell eNodeBs should better be aware of the radio resource usage of other eNodeBs in the neighbourhood, especially macro cell eNodeBs, as illustrated in FIG. 1. FIG. 1 is a schematic diagram of a HetNet wireless communication system. A HetNet wireless communication network 1 includes multiple macro cell eNodeBs such as eNodeB 10. For simplicity of illustration only the macro cell eNodeB 10 is shown in FIG. 1. Within the radio service coverage of the macro cell eNodeB 10 the network operator can also deploy multiple small cells in order to enhance spectrum utilization of the HetNet communication system and also improve quality of service at the cell-edge of eNodeB 10. For example, there may be small cell eNodeBs 21, 22, 23, 24 and 25 deployed within the marco cell eNodeB 10. The small cell eNodeBs 21, 22, 23, 24 and 25 may be integrated with the macro cell eNodeB in the HetNet through one or more network devices (such as a network device 20) in a core network.

However, in a current Long-term Evolution (LTE) system there are very limited inter-cell or inter-tier negotiations. Even though LTE specifications define X2-interfaces, usually the X2-interfaces are deployed between eNodeBs from the same communication equipment vendors. Although X2-interfaces may be deployed between the macro cell eNodeBs and the neighbouring small cell eNodeBs, in some cases the backhaul may not always be available between different types of eNodeBs, or the backhaul may not meet the delay and bandwidth requirements of inter-cell/inter-tier coordination. Due to the lack of communication links to carry channel information or resource usage decisions between macro and small cells, interference management needs to be done autonomously at the small cell layer based on measurement of received signals from neighbouring cells. Autonomous interference management carried out at small cell eNodeBs can also avoid extra signalling and related operational cost for deploying X2-interfaces between the macro cell eNodeBs and the neighbouring small cell eNodeBs.

A possible solution to the HetNet system is self-organization of small cell eNodeBs and allocation of the radio resources of the small cells in an autonomous manner without involving a huge amount of cross-tier negotiations. To achieve this goal the small cells need to be equipped with a cognitive and learning capability to be aware of the interference situation and other parameters based on measurements of radio links.

For example, in an Orthogonal Frequency-Division Multiplexing (OFDM) wireless communication system, such as a LTE wireless communication supporting Third Generation Partnership Project (3GPP) communication standard, in order to optimise the transmission across the sub-bands appropriately, e.g., to enable a fast (per transmission time interval (TTI)) response on any change in interference or channel conditions, the small cells need to allow an advanced sniffer to detect neighbouring macro cell per physical radio resource block (PRB) usage by using one or more of following options: (i) commercial product, cognitive radio spectrum sensing unit to measure downlink (DL) received interference power (related to physical downlink shared channel (PDSCH)), or (ii) a sensing unit to decode DL transmission of the macro cell eNodeB where the sensing unit may be embedded in one or more small cells or installed along with the small cells.

In the solution of employing a sensing unit to decode DL transmission of the macro cell eNodeB (related to physical downlink control channel (PDCCH)), as PDCCH carries the downlink scheduling assignments and uplink scheduling grants, this solution seems a better source of very short term information in relation to what the macro cell eNodeB is transmitting or will be transmitting in DL.

As can be understood by a person of ordinary skill in the field of LTE communication systems, PDCCH information data are mapped on aggregations of Common Control Elements (CCE). For example, one CCE contains 72 bits of data, and there are 4 aggregations allowed: 1, 2, 4 or 8 CCEs as defined in 3GPP Technical Standard. The last 16 cyclic redundancy check (CRC) bits of PDCCH are scrambled by a temporary identifier assigned by the eNodeB to the UE, such as cell-radio network temporary identifier (C-RNTI). The information bits appended with scrambled CRC bits are then convolutionally encoded by the tail-biting convolutional encoder at the eNodeB.

Conventionally, when any given UE wants to decode its PDCCH allocation data it must first convolutionally decode encoded data. In a worst case scenario the UE needs to attempt all four combinations of aggregations within its UE-specific search space as well as common search space. Given that the Viterbi algorithm is used for convolutional decoding, the one (out of four) with the highest metric and ending up in the same state indicates the correct PDCCH sequence. Following the convolutional decoding, the UE descrambles the last 16 bits of the received sequence with its C-RNTI to obtain the CRC bits that were appended in the scrambling process at the eNodeB. If the CRC check is passed, the assumption is made by the UE that downlink control information (DCI) in PDCCH has been received by the UE correctly. Essentially, the CRC bits provide an additional layer of data verification for the UE.

Small cells in the proposed scenario have to recover radio resource allocations by the macro cell eNodeB for all UEs within radio service coverage of the marco cell eNodeB. However, the small cell does not possess knowledge of C-RNTIs used by the UE in the macro-cell. In order to obtain the radio resource allocation (map) of the macro cell, in theory, any given small cell has to decode all PDCCH messages for all UEs. Decoding all PDCCH messages for all UEs may be translated to convolutionally decoding PDCCH messages in the total search space and discard the CRC verification step. CRC verification seems impossible in the case where the sniffer has no knowledge of C-RNTI as the CRC section of the sequence is masked by exclusively-ORed with C-RNTI of the UE in the PDCCH messages. Nonetheless, without CRC check, the aggregation level that should be used by the UE can never be determined, and thus the UE cannot confirm that the blind decoding of the received PDCCH message was successful.

For example, published international patent application WO2014019155 A1 proposes a similar approach to acquire, at a given base station, uplink and downlink scheduling information from a neighbouring cell through blindly decoding PDCCH by different C-RNTI parameters for CRC check until a C-RNTI is found corresponding to the CRC. However, such an approach is very time consuming since there are currently 4,083 different C-RNTI parameters that need to be blind decoded. It is simply not feasible to obtain the correct C-RNTI by attempting more than 4,083 blind decoding on PDCCH sequence within a short duration, such as a TTI (equivalent to 10 millisecond (ms)). If taking into account different aggregation levels of CCEs in PDCCH, blind decoding using each C-RNTI may require attempting 44 combinations of DCIs at all possible aggregation levels in PDCCH, and the total number of blind decoding using each C-RNTI may, in a worst case scenario, approach 179,652 blind decoding calculations per TTI. WO2014019155 A1 provides no further details in relation to how to blindly decode PDCCH messages for acquiring uplink and downlink scheduling information from a neighbouring cell or more neighbouring cells within a TTI.

Against this background, there is a need for a method, an apparatus or a system to efficiently and accurately acquire scheduling information assigned to one or more user devices within a radio service coverage of a neighbouring cell eNodeB.

SUMMARY

In a first aspect the present disclosure provides a method executed by a communication device for acquiring scheduling information transmitted from a base station located in a cell covering the communication device, the method comprising: determining, by the communication device, a set of candidate random access radio network temporary identities (RA-RNTIs);
receiving, by the communication device, a first downlink control channel message transmitted by the base station, via an air interface;
attempting to blind decode, by the communication device, downlink control information (DCI) bits in common search space in the received first downlink control channel message by using each RA-RNTI in the determined set of candidate RA-RNTIs, so as to determine a location of random access response (RAR) corresponding to an active user equipment (UE) in a corresponding downlink shared channel message;
receiving, by the communication device, the corresponding downlink shared channel message transmitted by the base station, via the air interface;
decoding, by the communication device, the RAR in the received downlink shared channel message by using the determined location of the RAR so as to acquire a temporary cell random access radio network temporary identity (TC-RNTI) from one of the RARs in the received downlink shared channel message;
receiving, by the communication device, a second downlink control channel message transmitted by the base station, via the air interface;
blind decoding downlink control information (DCI) in common search space and user-specific search space of the received second downlink control channel message by using the acquired TC-RNTI, so as to acquire scheduling information transmitted by the base station.

The first and second downlink control channel messages may be transmitted via a PDCCH.

The corresponding downlink shared channel message may be transmitted via a PDSCH.

The DCI being decoded by the communication device may be of DCI format 1A or of DCI format 1C.

The scheduling information may be for Time Division Duplex (TDD) communication, and the step of determining a set of candidate RA-RNTIs may comprise:
determining the set of candidate RA-RNTIs according to an equation (1):

$$RA\_RNTI=1+t\_id+10*f\_id \qquad \text{equation (1),}$$

wherein the t_id is the index of the first subframe of the specified physical random access channel (PRACH) and 0<=t_id<10, and f_id is the index of the specified PRACH within that subframe, in ascending order of frequency domain and 0<=f_id<6.

The scheduling information may be for Frequency Division Duplex (FDD) communication, and the step of determining a set of candidate RA-RNTIs may comprise:
determining the set of candidate RA-RNTI according to an equation (2):

$$RA\_RNTI=1+t\_id \qquad \text{equation (2),}$$

wherein the t_id is the index of the first subframe of the specified physical random access channel (PRACH) and 0<=t_id<10.

The method may further comprise:
attempting to use each RA-RNTI in the determined set of candidate RA-RNTIs to demask CRC encoded in the DCI until the CRC is successfully demasked, so as to decode the DCI and determine the location of the RAR corresponding to the active UE in the corresponding downlink shared channel message.

The communication device may be part of another base station in another cell overlapped with the cell of the base station.

The communication device may be incorporated with the another base station in the another cell overlapped with the cell of the base station.

The another base station may comprise a base station client located at the another cell and a base station server located at a remote site distant from both the cell and the another cell.

The base station server may be connected to multiple downlink base station clients.

The step of blind decoding DCIs in the user-specific search space of the received second downlink control channel message by using the acquired temporary C-RNTI may comprise:
  determining a CCE index in the user-specific search space of the received second common downlink control channel message according to the acquired TC-RNTI.

After the step of acquiring scheduling information of the UE in the received second downlink control channel message the method may further comprise:
  determining the acquired TC-RNTI to be a C-RNTI assigned to the UE by the base station.

After the step of determining the acquired TC-RNTI to be a C-RNTI assigned by the base station, the method may further comprise:
  outputting the acquired scheduling information in association with the determined C-RNTI to a memory for storage, in order to identify the acquired scheduling information as the acquired scheduling information of the UE.

After the step of determining the acquired TC-RNTI to be a C-RNTI assigned to the UE by the base station, the method may further comprise:
  outputting the acquired scheduling information to the base station server for storage in order to identify the acquired scheduling information as the acquired scheduling information of the UE.

After the step of determining the acquired TC-RNTI to be a C-RNTI assigned to the UE by the base station, the method may further comprise:
  acquiring other scheduling information of the UE by using the determined C-RNTI in one or more downlink control channel messages subsequent to the received second downlink control channel message.

In a second aspect the present disclosure provides a communication device for acquiring scheduling information transmitted from a base station located in a cell covering the communication device, the communication device comprising:
  a decoder configured to determine a set of candidate RA-RNTIs;
  a radio frequency (RF) processing unit connected to the decoder and configured to receive a first downlink control channel message transmitted by the base station, via an air interface;
  the decoder further configured to attempt to blind decode DCI in common search space in the received first downlink control channel message by using each RA-RNTI in the determined set of candidate RA-RNTIs so as to determine a location of RAR corresponding to a UE in a corresponding downlink shared channel message;
  the RF processing unit further configured to receive the corresponding downlink shared channel message transmitted by the base station via the air interface;
  the decoder further configured to decode the RAR in the received downlink shared channel message by using the determined location of the RAR so as to acquire a TC-RNTI from one of the RARs in the received downlink shared channel message;
  the RF processing unit further configured to receive a second downlink control channel message transmitted by the base station via the air interface;
  the decoder further configured to blind decode DCIs in common search space and user-specific search space of the received second downlink control channel message transmitted by the base station by using the acquired TC-RNTI to acquire scheduling information.

The first and second downlink control channel messages may be transmitted via a PDCCH.

The downlink shared channel message may be transmitted via a PDSCH.

When the scheduling information is for TDD communication, the decoder is configured to determine the set of candidate RA-RNTI according to an equation (1):

$$\text{RA\_RNTI} = 1 + t\_id + 10 * f\_id \qquad \text{equation (1)},$$

wherein the $t\_id$ is the index of the first subframe of the specified PRACH and $0 <= t\_id < 10$, and $f\_id$ is the index of the specified PRACH within that subframe, in ascending order of frequency domain and $0 <= f\_id < 6$.

When the scheduling information is for FDD communication, the decoder may be configured to determine the set of candidate RA-RNTI according to an equation (2):

$$\text{RA\_RNTI} = 1 + t\_id \qquad \text{equation (2)},$$

wherein the $t\_id$ is the index of the first subframe of the specified PRACH and $0 <= t\_id < 10$.

The communication device may be part of another base station in another cell overlapped with the cell of the base station.

The communication device may be incorporated with the another base station in the another cell overlapped with the cell of the base station.

After the information extractor acquires the scheduling information of the user device in the received second downlink control channel message by using the acquired temporary C-RNTI, the information extractor is configured to determine the acquired temporary C-RNTI to be a C-RNTI assigned to the UE by the base station.

The device may further comprise:
  an information output connected to the information extractor and configured to output the acquired scheduling information in association with the determined C-RNTI of the UE to a memory for storage in order to identify the acquired scheduling information as the acquired scheduling information of the UE.

The device may further comprise:
  an information output connected to the information extractor and configured to output the acquired scheduling information to a base station server for storage, in order to identify the acquired scheduling information as the acquired scheduling information of the UE, wherein the base station server manages the another base station.

BRIEF DESCRIPTION OF DRAWINGS

Embodiments of the invention will now be described by way of example only with reference to the accompanying drawings, in which.

DETAILED DESCRIPTIONS OF EXEMPLARY EMBODIMENTS

Figure 1:
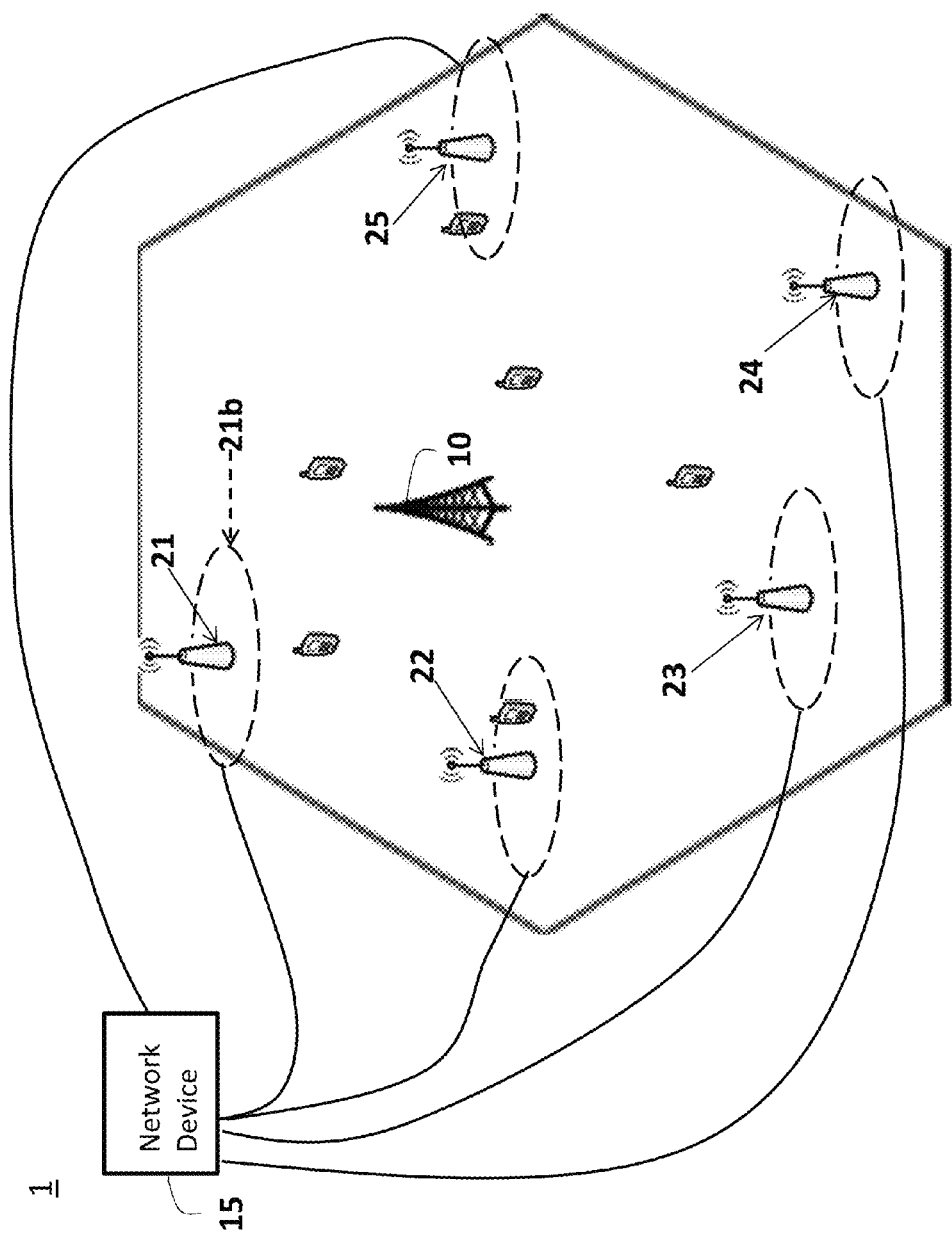
FIG. 1 is a schematic diagram of a HetNet wireless communication system.

In the following description, numerous specific details are set forth in order to provide a thorough understanding of various illustrative embodiments of the invention. However, it will be understood by those skilled in the art that embodiments of the invention may be practiced without some or all of these specific details. In other instances, well known process operations have not been described in detail so as to not unnecessarily obscure pertinent aspects of embodiments being described. In the drawings, like reference numerals refer to same or similar functionalities or features throughout the several views.

In view of the aforementioned problems or challenges faced by wireless communication networks with the HetNet communication system utilizing OFDM technology for multiple access, the present disclosure provides a communication apparatus (such as a communication device) and methods for efficiently and more accurately acquiring scheduling information assigned to user devices by neighbouring cell eNodeBs in a wireless communication network by using intelligently selected network temporary identifier(s) to blind decode common search space and/or UE-specific search space of the physical downlink control channel message transmitted by neighbouring cell eNodeBs in order to acquire scheduling information assigned to one or more user devices within radio service coverage of the neighbouring cell eNodeBs.

Figure 2:
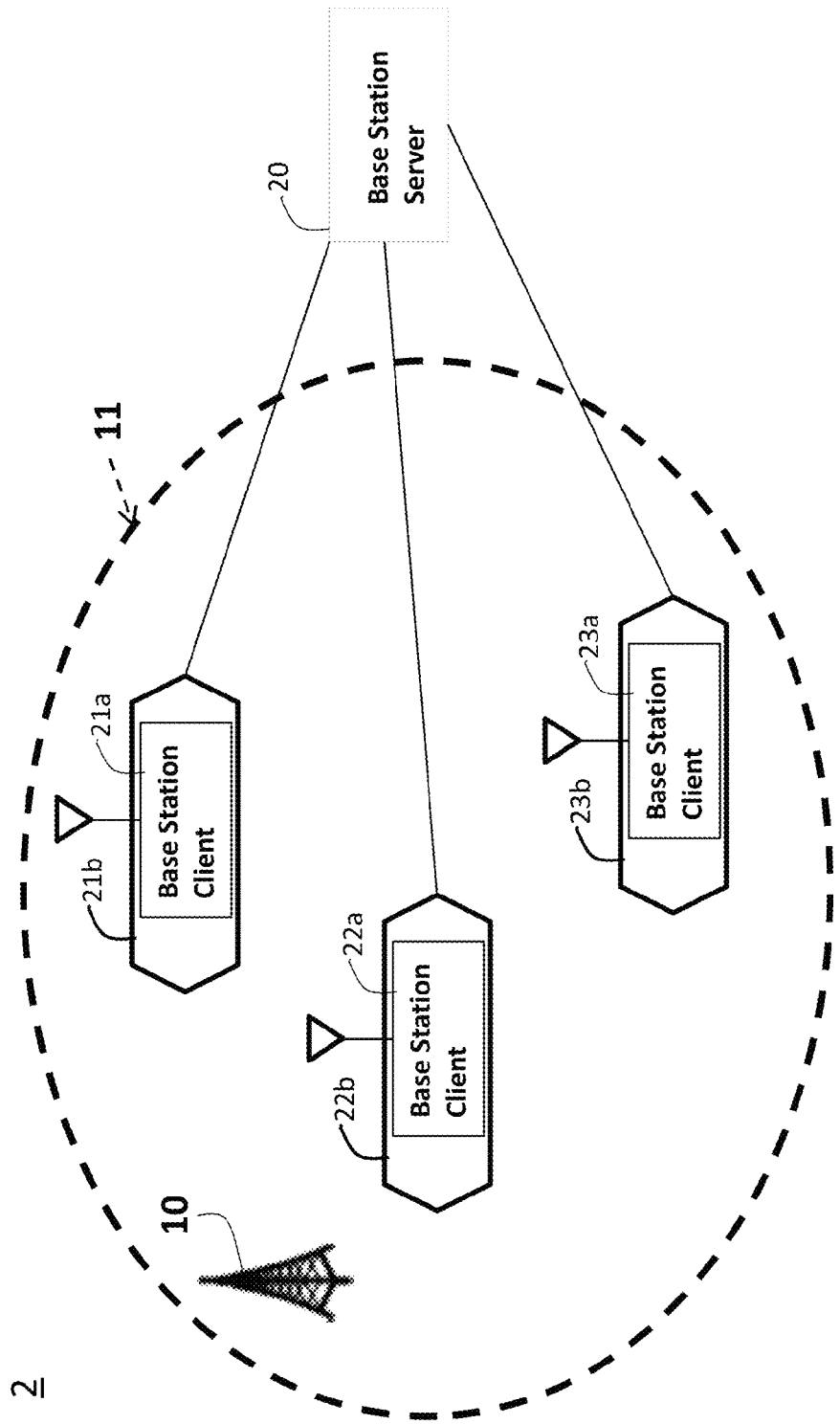
FIG. 2 illustrates architecture of an exemplary communication network according to an embodiment of the present disclosure.

FIG. 2 illustrates architecture of an exemplary communication network 20 according to an embodiment of the present disclosure. Referring to FIG. 2, the exemplary communication network 20 is a HetNet communication system which includes multiple macro cells and small cell base stations deployed within some or all of the macro cells. FIG. 2 is a simplified schematic illustrating merely a macro cell eNodeB 10 and, within its radio service coverage 11, there are deployed three exemplary small cell base station clients 21a, 22a, 23a within its small cell radio service coverage 21b, 22b, 23b. In the communication network 20, a communication device can be embedded with some or all of the small cell base station clients 21a, 22a, 23a, or disposed alongside the small cell base station clients 21a, 22a, 23a. The small cell base station clients 21a, 22a, 23a are communicatively connected with a base station server 20 and integrated with the macro cell wireless communication system (which includes the macro cell eNodeB 10) via base station server 20.

Figure 3:
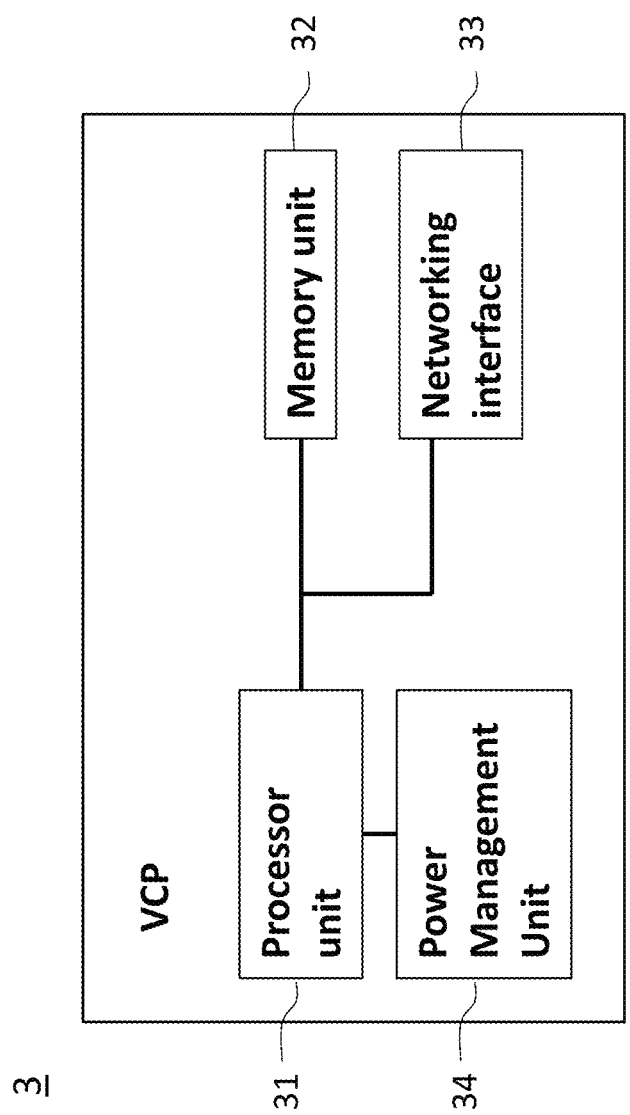
FIG. 3 is a schematic diagram illustrating physical blocks of a virtual cloud platform (VCP) in the proposed Cloud-radio Access Network (C-RAN) system of the proposed HetNet communication system according to one embodiment of the present disclosure.

FIG. 3 is a schematic diagram illustrating physical blocks of a virtual cloud platform (VCP) 3 in the proposed Cloud-Radio Access Network (C-RAN) system of the proposed HetNet communication system 2 according to one embodiment of the present disclosure. Referring to FIG. 3, the VCP 3 may be a physical computing machine, a blade server or a blade/card in a rack, which may provide implementation of the base station server 20 shown in FIG. 2. The VCP 3 may include multiple baseband units (BBU) respectively communicating with base station clients, such as the small cell base station clients 21a, 22a, 23a.

The VCP 3 may include at least one processor unit 31, a memory unit 32, a networking interface 33 and a power management unit 34. The processor unit 31 is logically or electrically connected with the memory unit 32, the networking interface 33 and the power management unit 34. The processor unit 31 may be a multi-core processor which may be configured to execute software codes/computer program codes embedded in the memory unit 32. The memory unit 32 may include static memory storage devices and dynamic memory storage devices. The software codes/computer program codes corresponding to the software instances of radio resource control (RRC) sub-layer, the Packet Data Convergence Protocol sub-layer (PDCP) sub-layer, the Radio Link Control sub-layer (RLC) sub-layer, the Medium Access Control (MAC) sub-layer and partial portion of the MAC/physical (PHY) entity of each BBU may be stored in the static memory storage devices of the memory unit 32. Also, the dynamic memory device of the memory unit 32 may be configured by the processor unit 31 to execute the software codes/computer program codes corresponding to instances of the BBU, a cluster-level scheduler (not shown) in the base station server 20, and the cell-level packet scheduler entity corresponding to each small cell. The networking interface 33 may be an optical link through which the BBU is connected to its corresponding cell site equipment, which may include a Remote Radio Head (RRH) and a partial portion of the MAC/PHY entity. The power management unit 34 may include a power supply (not shown) configured to provide electrical power to the VCP 3 and management logics (not shown) configured to control the power supply to the VCP 3.

Figure 4:
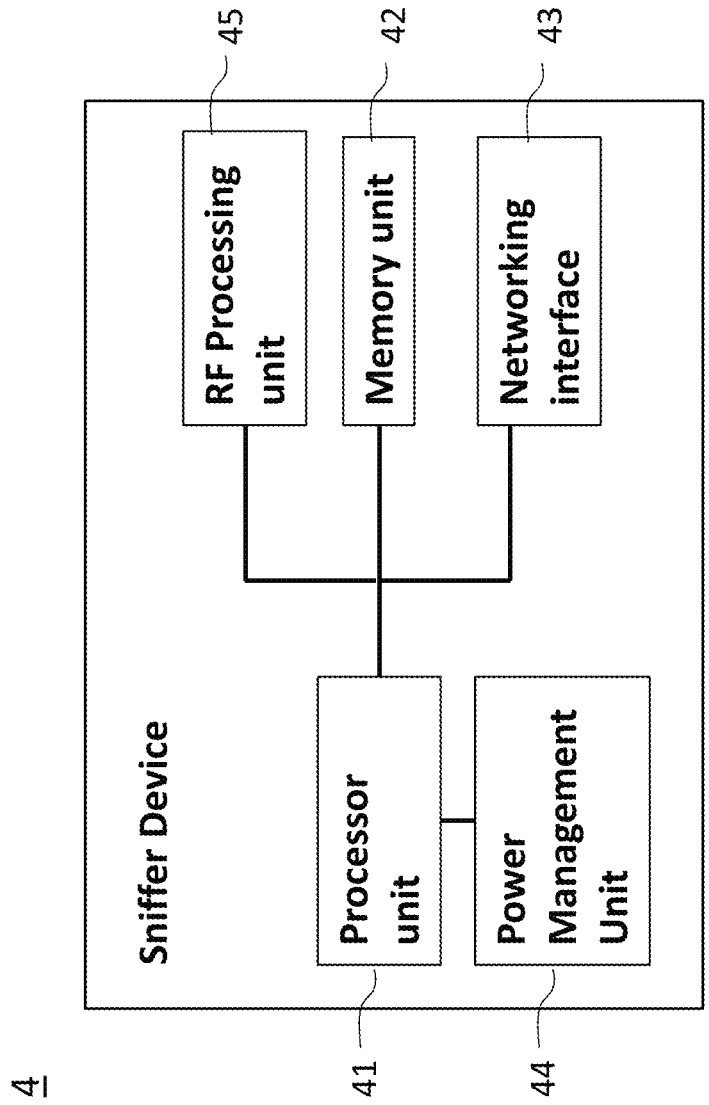
FIG. 4 is a schematic diagram illustrating a functional block diagram of an exemplary communication device in the proposed HetNet communication system.

FIG. 4 is a schematic diagram illustrating a functional block diagram of an exemplary communication device 4 in the proposed HetNet communication system 2, for example, an LTE network. In the present disclosure, the communication device 4 is a sniffer device. The sniffer device 4 may be embedded within cell site equipment which in turn may be a small cell base station client. Alternatively, the sniffer device is disposed alongside the small cell base station client.

Referring to FIG. 4, the communication device 4 may include at least one processor unit 41, a memory unit 42, a networking interface 43, a power management unit 44, and a radio frequency (RF) processing unit 45. The processor unit 41 is logically or electrically connected with the memory unit 42, the networking interface 43, the power management unit 44, and the RF processing unit 45.

The processor unit 41 may be a multi-core processor which may be configured to execute software codes embedded in the memory unit 42. The process unit 41 may include digital signal processor (DSP) cores for demodulating OFDM signals transmitted by the macro cell eNodeB by using an forward Discrete Fourier transform (DFT) algorithm, which can be implemented by using Fast Fourier Transform (FFT) running on the DSP cores.

The memory unit 42 may include static memory storage devices and dynamic memory storage devices. The software codes corresponding to the software instances of partial portion of the MAC/PHY entity of the communication device 4 may be stored in the static memory storage devices of the memory unit 42. The dynamic memory device of the memory unit 42 may be configured by the processor unit 41 to execute the software codes/computer program codes corresponding to instances of the partial portion of the MAC/PHY entity of the communication device 4. The networking interface 43 may be an optical link through which the communication device 4 is connected to its corresponding BBU centralized at the base station server 20, which may include the BBU, the cluster packet scheduler, the VCP packet scheduler and the remaining partial portion of the MAC sub-layer entity. The power management unit 44 may include a power supply (not shown) configured to supply electrical power to the communication device 4 and management logics (not shown) configured to control the power supply to the communication device 4.

The RF processing unit 45 may include an antenna (not shown) and radio frequency signal processing components (not shown) such as, but not limited to, a digital-to-analogue signal converter (DAC), an analogue-to-digital signal converter (ADC), an oscillation signal generator, a modulator, a demodulator, a power amplifier, a bandpass filter and so forth.

Before describing the details of operations of the communication device 4 for acquiring scheduling information assigned to user devices by a neighbouring cell eNodeB in a wireless communication network, a brief description of how a given UE acquires its DL or UL scheduling information from a serving cell macro cell eNodeB of the UE is provided below.

Figure 5:
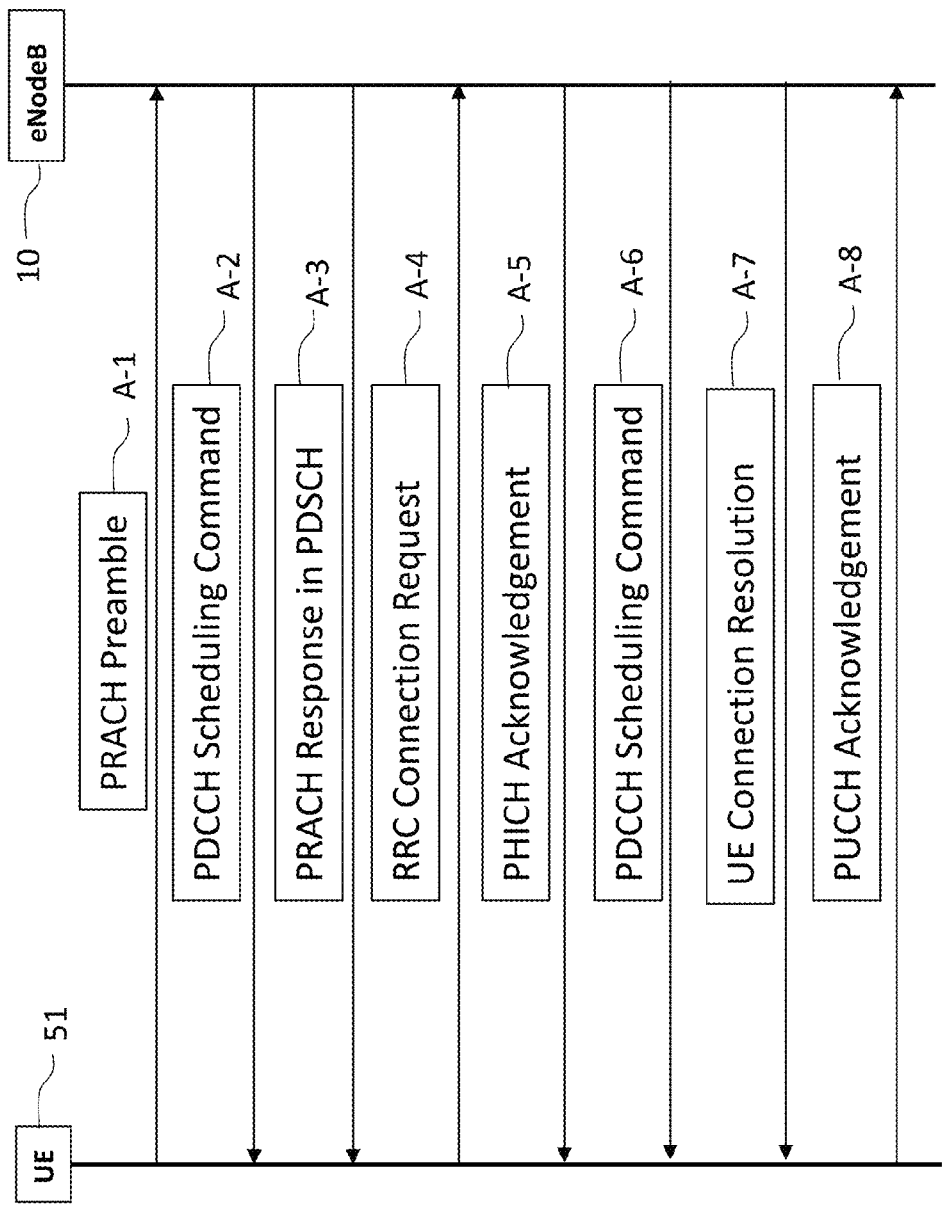
FIG. 5 is a simplified sequence flow diagram illustrating conventional messages transmitted between a UE and the macro cell eNodeB for the UE to acquire UL/DL scheduling information from the eNodeB.

FIG. 5 is a simplified sequence flow diagram illustrating a conventional sequence in which messages are transmitted between a UE 51 and the macro cell eNodeB 10 for the UE 51 to acquire UL/DL scheduling information from the eNodeB 10. In FIG. 5, at step A-1, the UE 51 transmits a preamble in physical random access channel (PRACH) and the UE assigns its selected random access radio network temporary identifier (RA-RNTI) in its preamble along with a preamble index in the preamble. It should be noted that, at the same time, there may be one or more UEs transmitting the same preamble to the same eNodeB 10.

At step A-2, when the eNodeB 10 receives the preamble (s) from UE(s) within its radio service coverage, the eNodeB 10 responds by transmitting a PDCCH scheduling command directed to UE(s) with RA-RNTI.

At step A-3, in response to receipt of the preamble(s) from the UE(s) within its radio service coverage, the eNodeB 10 transmits a random access response (RAR) such as a PRACH Response in a physical downlink shared channel (PDSCH), where the RAR contains a preamble index, timing advance, uplink grant and a temporary cell radio network temporary identifier (T-CRNTI). At the step A-3, the UE 51 assumes that it is assigned a T-CRNTI by the eNodeB 10.

In response to receipt of the PDCCH scheduling command at step A-2 and the PRACH Response in PDSCH at step A-3, UE 51 has not yet obtained any scheduled UL/DL radio resource, and thus UE 51 at step A-4 responds by transmitting a RRC Connection Request message which contains its UE identity.

In response to receipt of the RRC Connection Request message from UE 51 at step A-3, at step A-5 eNodeB 10 transmits a Physical Hybrid-ARQ Indicator Channel (PHICH) Acknowledgement. At step A-6 eNodeB transmits another PDCCH scheduling command message which is directed to T-CRNTI.

In response to receipt of the UE Connection Resolution message, if more than one UE performs simultaneous random-access attempts using the same preamble sequence in step A-1, listens to the same response message in step A-3 and therefore has the same temporary identifier (i.e., T-CRNTI), then at step A-7 the random access procedure consists of a downlink message for contention resolution. That is, eNodeB 10 at step A-7 transmits a UE Connection Resolution message (which contains a UE identity) to the UE (which has the UE identity the same as shown in the UE connection Resolution message). Only a UE which observes a match between the UE identity received in the step A-7 and the UE identity transmitted as part of step A-4 will declare the random-access procedure successful. If the UE has not yet been assigned a C-RNTI, the T-CRNTI from step A-6 is promoted to the C-RNTI. Finally, at step A-8 the UE which is assigned with the T-CRNTI by receiving the UE Connection Resolution message, transmits a Physical Uplink Control Channel (PUCCH) to the eNodeB 10.

Compared with the messages exchanged between the UE 51 and the eNodeB 10, the communication device 4 in fact does not need to transmit any uplink messages or exchange parameters with the eNodeB 10 but the communication device 4 can acquire DL and/or UL scheduling information assigned to one UE by the eNodeB 10 by passively receiving merely 3 messages from the eNodeB 10 and also processing the 3 messages accordingly in 3 main procedures. The DL scheduling information refers to radio resource assignment in DL, and the UL scheduling information refers to UL grant from the macro cell eNodeB. The following descriptions explain the detailed operations of the communication device 4 for acquiring DL and/or UL scheduling information assigned to one UE by the eNodeB 10.

Figure 6:
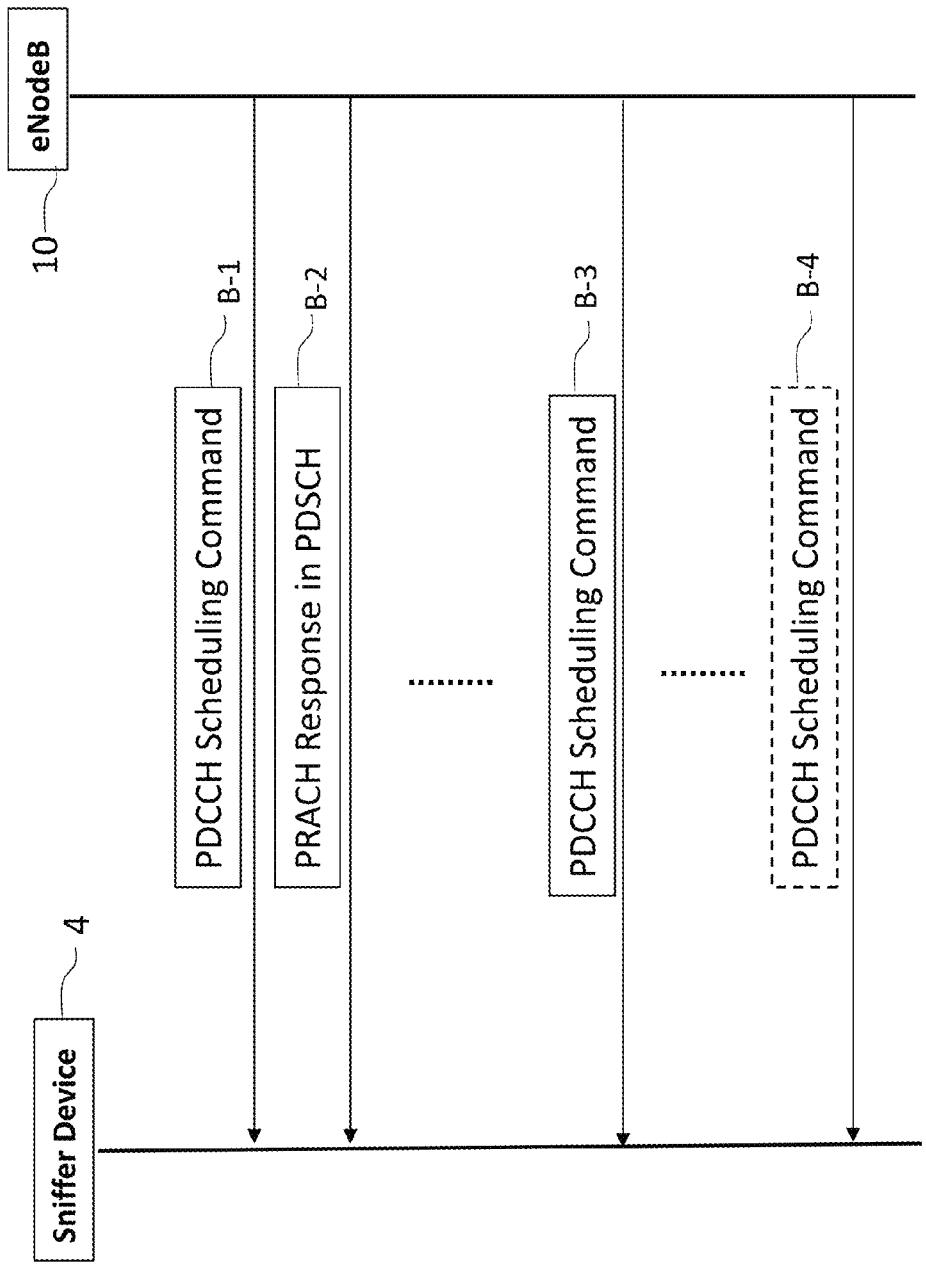
FIG. 6 is a sequence flow diagram illustrating the method of acquiring UL/DL scheduling information from a neighbouring macro cell eNodeB by a communication device.

FIG. 6 is a sequence flow diagram illustrating the method of acquiring UL/DL scheduling information from a neighbouring macro cell eNodeB 10 by the communication device 4. Prior to commencement of any procedures illustrated in FIG. 6, the communication device 4 has completed synchronization with the macro cell eNodeB 10 since the communication device 4 has required RF processing unit 45 and the processor unit 41, which further includes subscriber identity module (SIM). As such, the communication device 4 can perform following processes: (1) synchronized to Primary Synchronization Signals (PSS); (2) synchronized to Secondary Synchronization Signals (SSS); (3) listening to Master Information Block (MIB) of the macro cell eNodeB 10 on a broadcast channel and thus obtain downlink channel bandwidth in term of resource blocks (RBs), PHICH configuration (PHICH duration and PHICH resource), and System Frame Number (SFN); and (4) listening to System Information Block (SIB) and thus obtain cell access related information (e.g., Public land mobile network (PLMN) Identity List, PLMN Identity, tracing area code, cell identity and cell status), Cell Selection Information (e.g., Minimum Receiver Level) and Scheduling Information. When the communication device 4 is synchronized with the macro cell eNodeB 10 and obtained information from the MIB and the SIB, the communication device 4 can perform the method of acquiring scheduling information from the neighbouring macro cell eNodeB 10 for any UE within the radio service coverage of the eNodeB 10 until all scheduling information for next TTI is acquired.

As shown in FIG. 6, at step B-1, the communication device 4 is configured to select a RA-RNTI for a UE (that the communication device 4 assumes being served by the macro cell eNodeB 10). In particular, the communication device 4 is configured to determine a set of candidate RA-RNTI parameters for the operation at step B-1.

At step B-1, if the macro cell eNodeB 10 operates in Time Division Duplex (TDD) mode, then the DL/UL scheduling information is for TDD communication, and the step of determining a set of candidate RA-RNTIs by the communication device 4 may include:

determining the set of candidate RA-RNTI according to an equation (1):

$$RA\_RNTI=1+t\_id+10*f\_id \quad \text{equation (1),}$$

where the t_id is the index of the first subframe of the specified PRACH and 0<=t_id<10, and f_id is the index of the specified PRACH within that subframe, in ascending order of frequency domain and 0<=f_id<6.

However, the proposed communication device 4 is not limited to operating in the TDD mode. If the macro cell eNodeB 10 operates in Frequency Division Duplex (FDD) mode, then the DL/UL scheduling information is for FDD communication, the step of determining a set of candidate RA-RNTIs by the communication device 4 may include:

determining the set of candidate RA-RNTI according to an equation (2):

$$RA\_RNTI=1+t\_id \quad \text{equation (2),}$$

where the t_id is the index of the first subframe of the specified physical random access channel (PRACH) and 0<=t_id<10.

As can be seen from the equation (2), in the FDD mode, the communication device 4 only has to select an RA-RNTI for a UE from a set of 10 candidate RA-RNTI parameters.

At step B-1, communication device 4 is also configured to receive PDCCH Scheduling Command message, which carries a RA-RNTI parameter. Also, one of a set of DCIs in a common search region of the PDCCH message is protected by CRC, which was masked by a RA-RNTI received from a PRACH preamble by the macro cell eNodeB 10.

Figure 7:
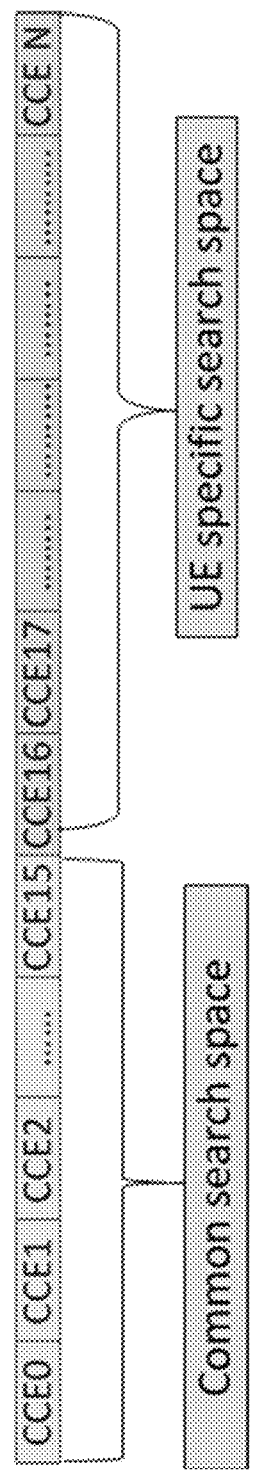
FIG. 7 illustrates an exemplary PDCCH frame in the LTE communication system.

FIG. 7 illustrates an exemplary PDCCH frame in the LTE communication system. Referring to FIG. 7, the PDCCH information basically includes two regions: common search region (or called common search space) and UE specific search region (or called UE specific search space). The common search region is usually a fixed number data structure, such as CCE0 to CCE15. The UE specific search region then depends on the bandwidth used by the LTE communication system and may cover the region from CCE16, CCE 17, . . . , CCE N, where N is greater than 17.

At step B-1, upon receiving the PDCCH, the communication device 4 also performs blind decoding on downlink control information (DCI) in the common search region of the PDCCH transmitted from the macro cell, and performs tail-bit convolutional decoding and conducts tCRC checking with the selected RA-RNTI parameter from the previously determined set of candidate RA-RNTI parameters, until the CRC checking is passed. When the CRC checking is passed, the communication device 4 successfully de-masks the CRC of the candidate PDCCH in the blind decoding process. The communication device 4 then uses the de-masked CRC to identify from the DCI the location of RAR in a corresponding downlink shared channel message (which is transmitted by the eNodeB 10 subsequent to the PDCCH at step B-1), so as to acquire a temporary cell-random access radio network temporary identity (Temporary C-RNTI) for the UE. The DCI being decoded by the communication device is either of DCI format 1A or of DCI format 1C.

At step B-2, the communication device 4 further receives a corresponding PDSCH from the macro cell eNodeB 10. Here, the corresponding PDSCH is the corresponding downlink shared channel message. The communication device 4 then extracts the PRACH Response message from the corresponding PDSCH. The PRACH Response message includes a Random Access Response, transmitted in the PDSCH, corresponding to the previously transmitted Random Access Preamble from a UE to the macro cell eNodeB 10.

Figure 8:
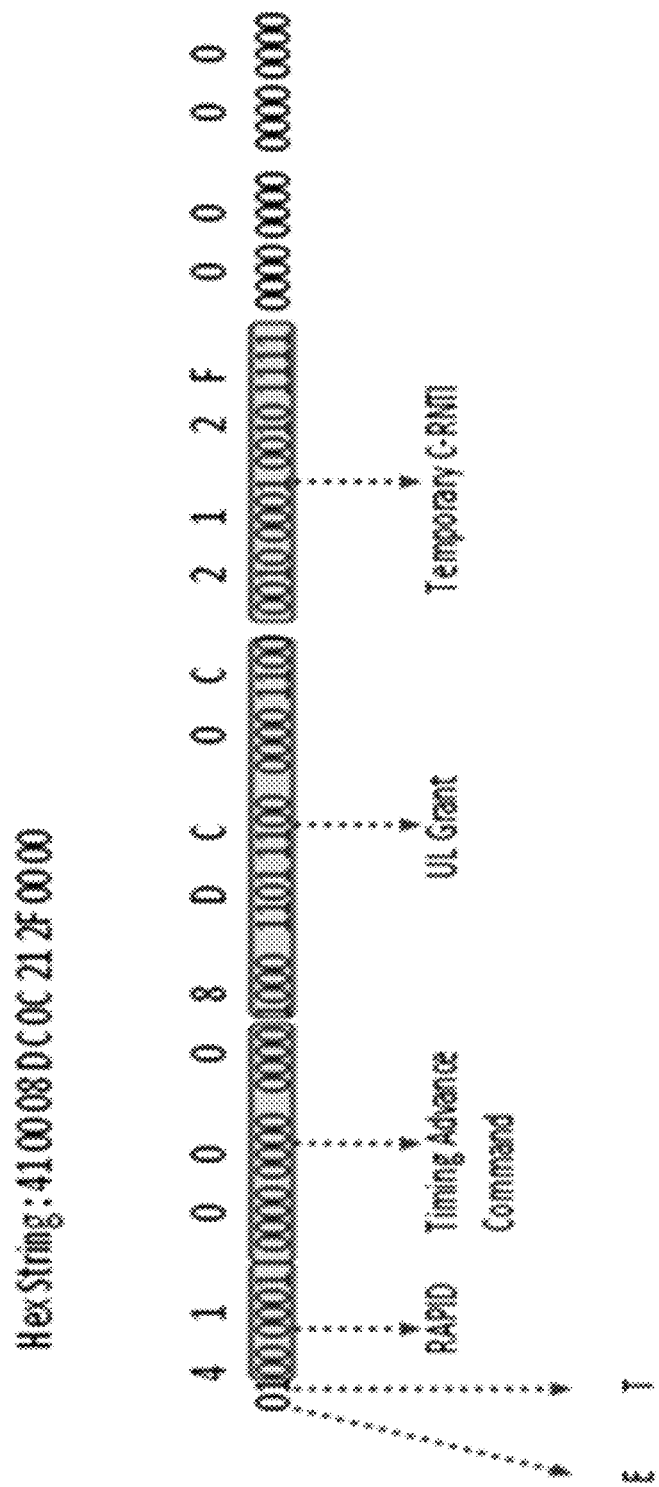
FIG. 8 illustrates an exemplary random access response in a LTE system.

FIG. 8 illustrates an exemplary RAR in a LTE system. Referring to FIG. 8, an example of a RAR with 5 MHz bandwidth is shown. The RAR may include a RAPID parameter which refers to a random access preamble index transmitted in a PRACH preamble from a UE to the eNodeB 10. The RAR includes timing advance command, UL Grant and Temporary C-RNTI.

At the step B-2, the communication device 4 uses the location of the RAR identified at step B-1 to decode the located RAR in order to acquire the Temporary C-RNTI encoded in the RAR.

Figure 9:
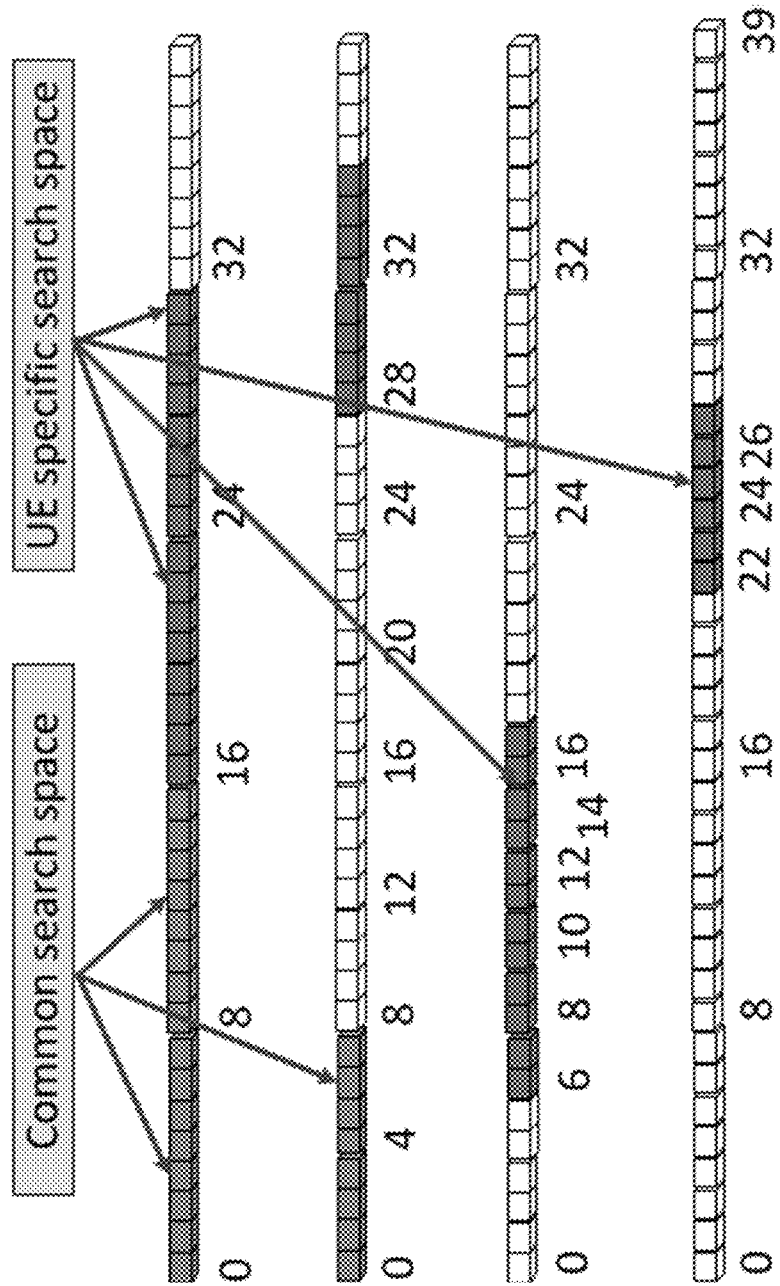
FIG. 9 illustrates different combinations of Downlink Control Information (DCI) of common search space and UE specific search space of PDCCH in a LTE system.

FIG. 9 illustrates a different combination of DCIs of common search space and UE specific search space of PDCCH in a LTE system. In one example of the PDCCH, the common search space may include two of aggregation level-8 DCIs and the UE specific search space may include another two of aggregation level-8 DCIs. In an alternative of PDCCH, the common search space may include two of aggregation level-4 DCIs and the UE specific search space may include another two of aggregation level-4 DCIs. In a further example of PDCCH, the UE specific search space may include 6 of aggregation level-2 DCIs. In yet another example of PDCCH, the UE specific search space may include 3 of aggregation level-2 DCIs.

At step B-3, the communication device 4 receives another PDCCH scheduling command message transmitted from the macro cell eNodeB 10, where the PDCCH scheduling command includes UL and DL scheduling for the UE with the C-RNTI. The Temporary C-RNTI acquired by the communication device 4 at step B-2 will become C-RNTI after step B-3 (also when full contention based RACH procedure is taken into consideration). As such, the communication device 4 also uses the acquired Temporary C-RNTI to blind decode common search space of the PDCCH received in step B-3 and also blind decode UE-specific search space. Then UL and DL scheduling information will be obtained for the UE whose C-RNTI is successfully obtained at step B-2. However, in the proposed method there is no need for the communication device 4 (which is a sniffer device 4 in this scenario) to determine which C-RNTI corresponds to which UE since the main objective is to find UL and DL scheduling information assigned by the macro cell eNodeB 10 at each TTI.

Step B-4 is an optional step in the method of acquiring scheduling information from macro cell eNodeB by the communication device 4. After the UL grant and DL radio resource assignment from the eNodeB 10 to the UE is acquired by the communication device 4 at step B-3, when the macro cell eNodeB 10 transmits another PDCCH scheduling command message at step B-4, the communication device 4 can use the previously acquired C-RNTI to decode other PDCCH messages and obtain the latest UL grant and DL radio resource assignment to the UE from the eNodeB 10.

The acquired UL grant and DL radio resource assignment to the UE from the eNodeB 10 will be further provided by the communication device 4 to the base station server 20 in the C-RAN system, such that the base station server 20 can assign radio resource which is not scheduled by the macro cell eNodeB 10 to the small cell eNodeB(s) surrounding the macro cell eNodeB 10. As such, the overall system capacity and system throughput will be improved based on the UL grant and DL radio resource assignment acquired by the communication device 4.

The proposed communication device 4 and the proposed method of acquiring the scheduling information of the neighbouring macro cell eNodeB is advantageous in the following respects:

(a) The communication device 4 does not need explicit knowledge of C-RNTI (of active UE). The sniffer device 4 attempts blind decoding on a received PDCCH message by intelligently selecting a set of candidate RA-RNTI parameters to perform blind decoding DCIs in common search region in possible PDCCH messages. Since the range of RA-RNTI is much smaller than the range of C-RNTI, within manageable complexity and more limited attempts, the communication device 4 is able to finish the blind decoding attempts by checking CRC, where CRC bits can only be known by XOR-ing scrambled bits with RA-RNTI at step B-1. Although there are many PDCCH candidates in each aggregation level of CCEs and common search region in PDCCH, without knowing the sizes of DCI, the amount of blind decoding by the communication device 4 is reduced to manageable level compared to the conventional art.

(b) Since the location of RAR in a corresponding PDSCH message is determined after the CRC check is passed at step B-1, Temporary C-RNTI can be easily acquired by the communication device 4 at step B-2 from the RAR message in the corresponding PDSCH message which is received after the PDCCH message.

(c) Since Temporary C-RNTI is acquired by the communication device 4 at step B-2 from the RAR message, the communication device 4 can guarantee to extract a decoded message and thus deliver useful information after tail-biting convolutional decoding is successful. This is because various DCI with different sizes are multiplexed with different aggregation levels and DCI sizes can only be confirmed through CRC checking. As the communication device 4 acquires the C-RNTI for a UE, even with many PDCCH candidates in each aggregation level of CCEs and common search region and UE-specific search region in PDCCH at step B-3, the communication device 4 can still successfully decode PDCCH and identify the location of UE-specific search region in OFDM symbol without knowing the sizes of DCI. As such, the communication device 4 can further acquire the UL grant and DL assignment transmitted to the UE by a neighbouring cell eNodeB or multiple neighbouring cell eNodeBs.

Figure 10:
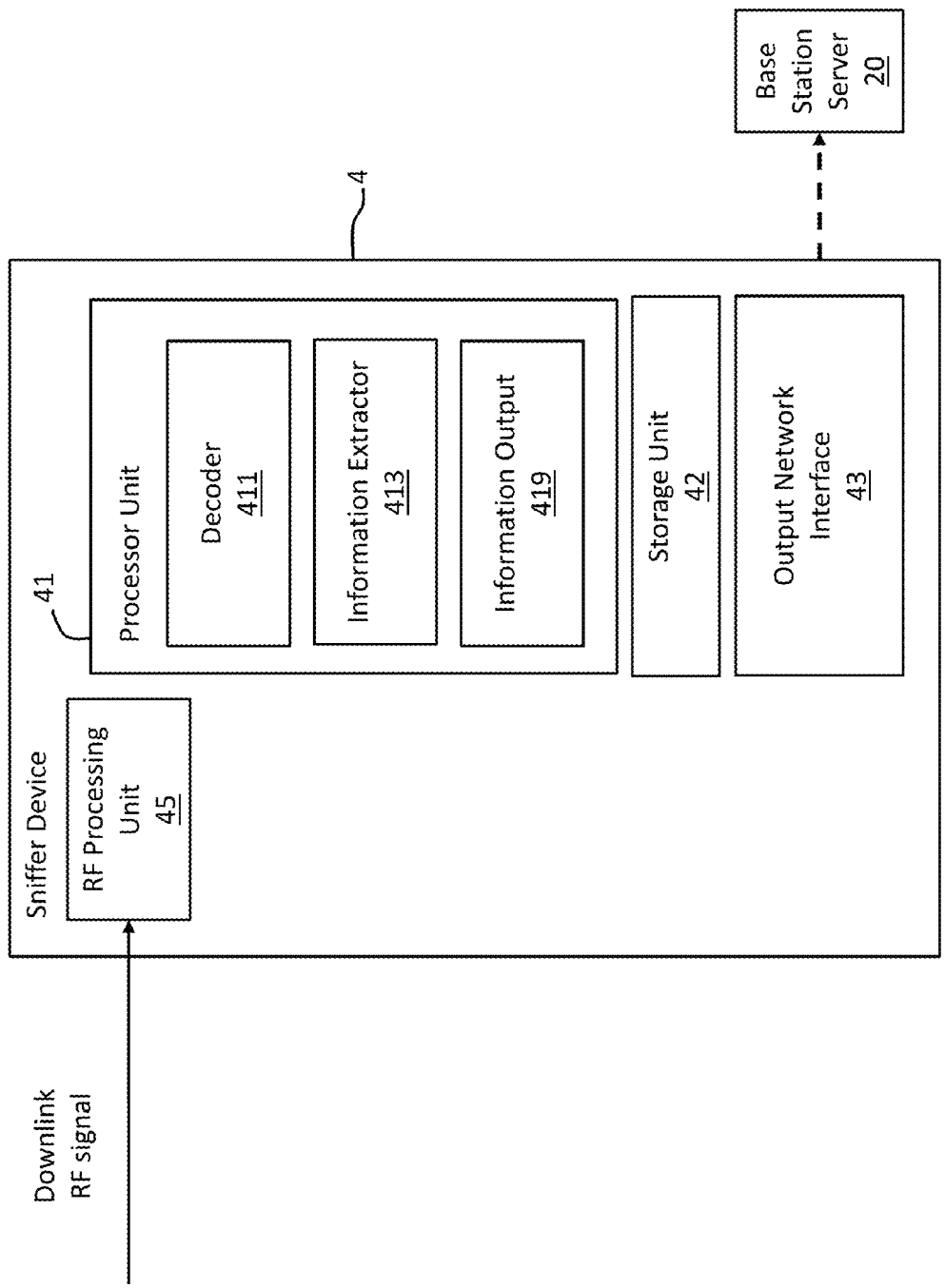
FIG. 10 is a schematic diagram illustrating functional blocks of a communication device connected to a base station server according to another embodiment of the present disclosure.

FIG. 10 is a schematic diagram illustrating functional blocks of a communication device 4 connected to a base station server 20 according to another embodiment of the present disclosure. Referring to FIG. 10, the communication device 4 includes a RF processing unit 45, a processor unit 41, a storage unit 42 and an output network interface 43 similar to those shown in FIG. 4. In particular, the RF processing unit 45 is configured as an input interface to receive downlink (DL) RF signal from any base station or eNodeB within its radio signal reception area and the RF processing unit 45 may include a receiver antenna, and include other RF processing components integrally performing required RF processing, such as down converting the received DL RF signal to baseband signal for the decoder in the processor unit 41 for further OFDM demodulation, blind decoding, convolutional decoding, CRC checking and other extraction of information from the decoded DL control channel or DL shared channel signals.

The processor unit 41 is configured to implement a decoder 411, an information extractor 413 and an information output 419. A person of ordinary skill in the art will appreciate that the decoder 411, the information extractor 413 and/or the information output 419 can be implemented by software functional elements inside memory of the storage unit 42 being operated by the processor unit 41. However, the decoder 411, the information extractor 413 and/or the information output 419 can also be implemented as dedicated electronic circuits inside the processor unit 41.

In the processor unit 41, the decoder 411 is communicatively or electrically connected to the RF processing unit 45, and the decoder 411 is configured to perform OFDM demodulation, blind decoding, convolutional decoding, CRC checking and other extraction of information from the decoded DL control channel or DL shared channel signals. The information extractor 413 is communicatively connected to the RF processing unit 45, the decoder 411 and the storage unit 42. The information extractor 413 is configured to extract information from the decoded DL control channel or DL shared channel signals, such as acquiring Temporary C-RNTI from DL shared channel message(s) and scheduling information from DL control channel message(s) transmitted from macro cell eNodeB or any neighbouring cell eNodeB, including small cell eNodeB or any eNodeB in the wireless communication system.

The information output 419 is communicatively or electrically connected to the decoder 411 and the information extractor 413 and the storage unit 42. The output network interface 43 is communicatively or electrically connected to the information output 419 and also connected to the base station server 20. The information output 419 is configured to output parameters and information extracted by the information extractor 413 to the storage unit 42 for temporary storage or output to the base station server 20 for further processing such as resource allocation or radio resource assignment of the small cell base stations managed by the base station server 20.

Figure 11:
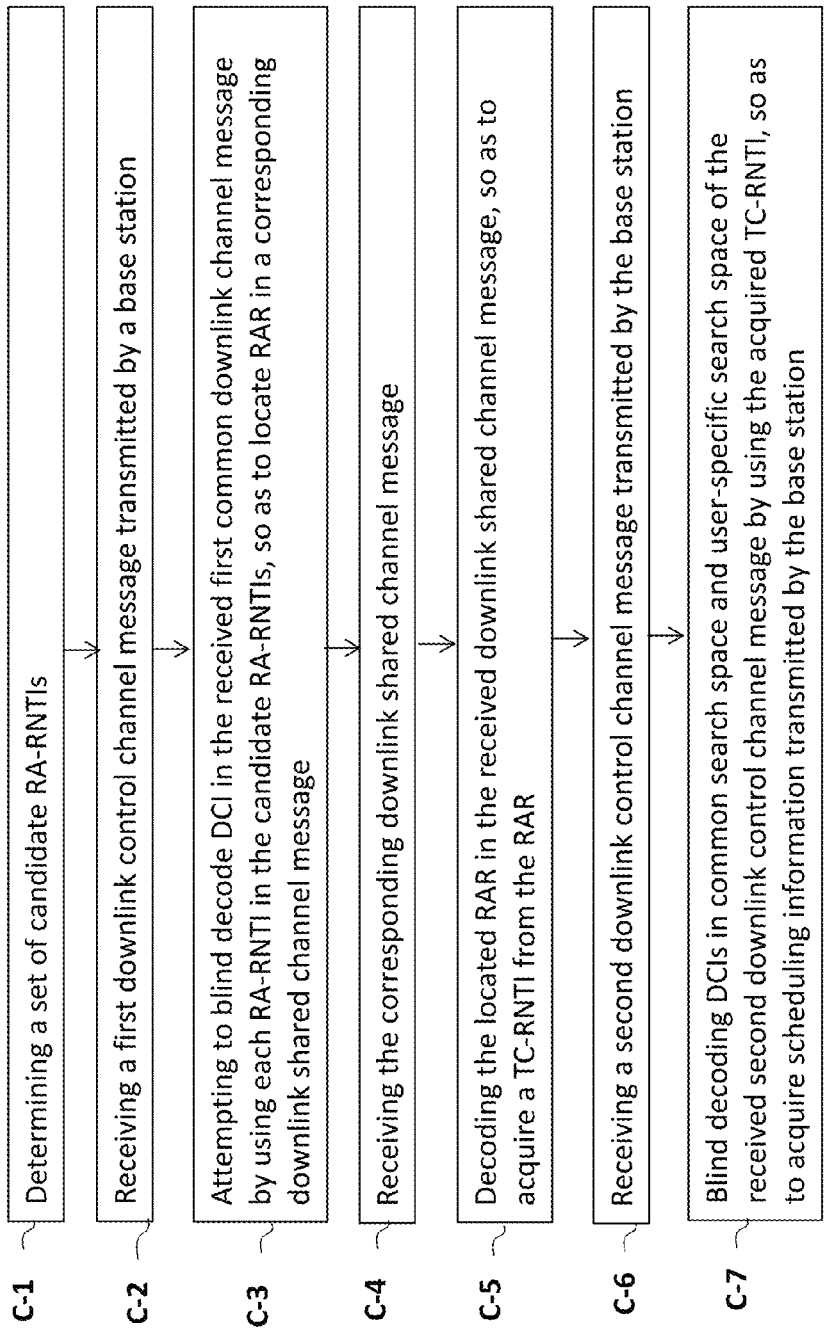
FIG. 11 is a flowchart illustrating a method of acquiring UL/DL scheduling information from a neighbouring cell eNodeB by the communication device according to an embodiment of the present disclosure.

FIG. 11 is a flowchart illustrating a method of acquiring UL/DL scheduling information from a neighbouring cell eNodeB by the communication device 4 according to an embodiment of the present disclosure. The method for acquiring scheduling information by the communication device 4 from the neighbouring cell eNodeB may include procedures illustrated in FIG. 11 and will be explained in accordance with functional elements shown in FIG. 10. Additionally, a person of ordinary skill in the art can envisage that the proposed method for acquiring scheduling information from the neighbouring cell eNodeB by the communication device 4 can be applied to acquire scheduling information from multiple neighbouring cell eNodeBs if the same procedures in FIG. 11 are executed after the communication device 4 performs PSS synchronization, SSS synchronization, obtaining information from MIB and obtaining information from SIB from another neighbouring cell eNodeB.

Figure 12:
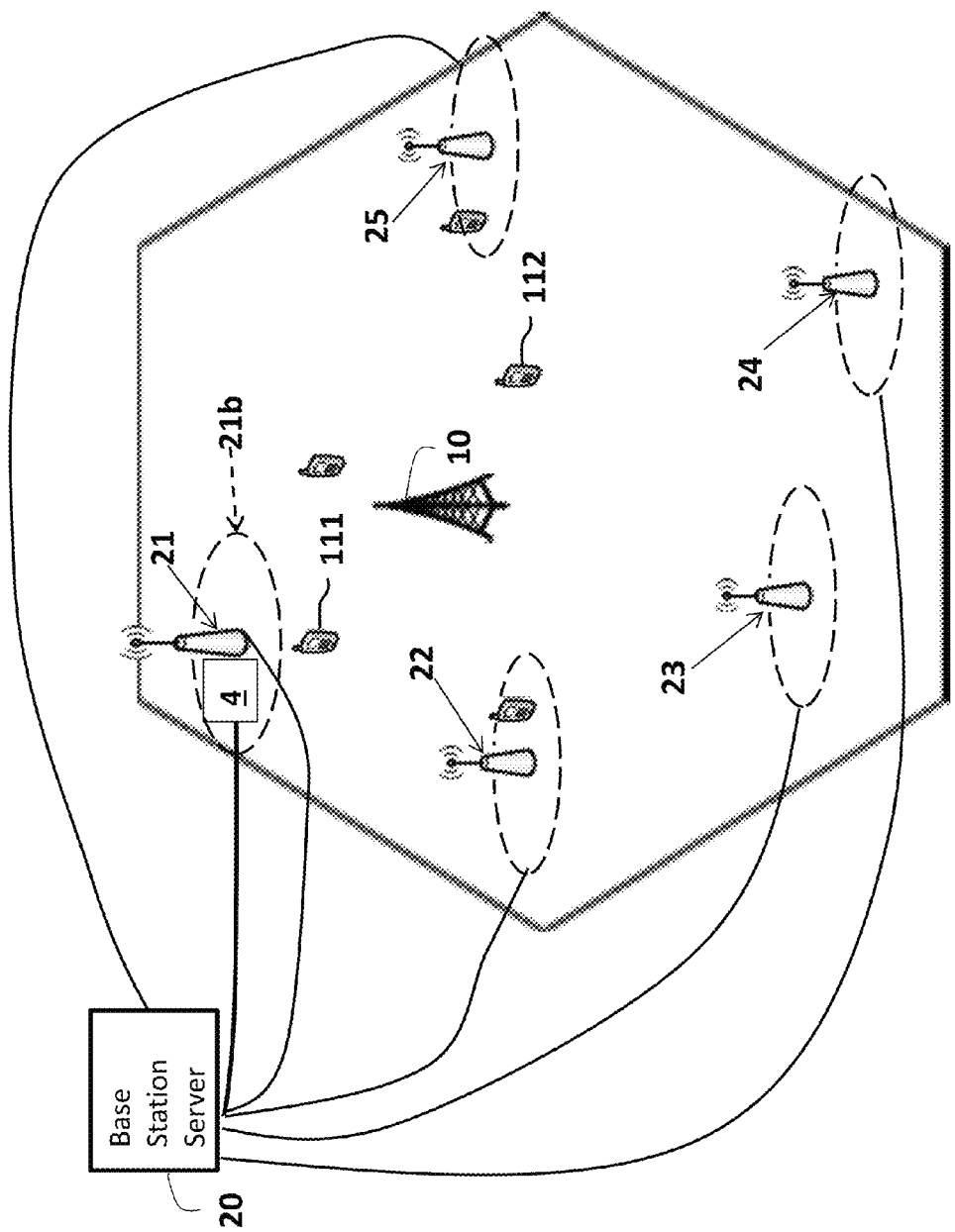
FIG. 12 illustrates an example of a cell in which the communication device is located in a small cell coverage area and configured to acquire scheduling information assigned by a neighbouring cell base station according to an embodiment of the present disclosure.

FIG. 12 illustrates an example of a cell in which the communication device 4 is located in a small cell coverage area and configured to acquire scheduling information assigned by a neighbouring cell base station according to an embodiment of the present disclosure. For example, the communication device 4 is deployed as part of a small cell eNodeB 21 within its radio service coverage area 21b or incorporated with the small cell eNodeB 21. The communication device 4 is then configured to acquire downlink radio resource assignment and UL grant assigned by the neighbouring cell eNodeB 10. Before step C-1, the communication device 4 performs PSS synchronization and SSS synchronization with the eNodeB 10, obtaining information from MIB and obtaining information from SIB from another neighbouring cell eNodeB 10.

In FIG. 11, at step C-1, the decoder 411 of the communication device 4 is configured to determine or generate a set of candidate RA-RNTIs. For example, if the neighbouring cell eNodeB, such as the macro cell eNodeB 10, operates in Time Division Duplex (TDD) mode, then the radio resource scheduling information assigned by the macro cell eNodeB 10 is for TDD communication, then the step of determining a set of candidate RA-RNTIs may include: determining the set of candidate RA-RNTI according to equation (1) above.

In another example, if the neighbouring cell eNodeB, such as the macro cell eNodeB 10, operates in FDD mode, then the radio resource scheduling information assigned by the macro cell eNodeB 10 is for FDD communication, then the step of determining a set of candidate RA-RNTIs may include: determining the set of candidate RA-RNTI according to equation (2) above:

After determining the set of candidate RA-RNTI parameters, at step C-3 the RF processing unit 45 of the communication device 4 is configured to monitor a downlink radio link for one or more downlink RF signals for receipt of a first downlink channel message transmitted by the macro cell eNodeB 10, via an air interface, for example a Uu interface. Also, the common downlink channel messages are transmitted by the macro cell eNodeB 10 via a PDCCH.

In response to receipt of the first common downlink channel message by the RF processing unit 45 of the communication device 4, at step C-3 the decoder 411 of the communication device 4, is configured to attempt to blind decode one or more DCIs in the received first downlink channel message by using each RA-RNTI in the determined set of candidate RA-RNTIs, so as to determine a location or locate a RAR corresponding to an active UE in a corresponding downlink shared channel. Also at the step C-3, when an RA-RNTI in the determined set of candidate RA-RNTIs successfully de-masks CRC of the candidate DCI (or candidate PDCCH) of the received first downlink channel message, the decoder 411 obtains from the candidate DCI a location of a RAR corresponding to the active UE in a corresponding downlink shared channel message.

After determining the location or locating a RAR in a corresponding downlink shared channel corresponding to an active UE within a radio service coverage of the macro cell eNodeB 10 by the decoder 411 at the step C-3, the RF processing unit 45 at step C-4 monitors a downlink radio link for one or more downlink RF signals for receipt of a DL shared channel message transmitted by the macro cell eNodeB 10, via an air interface. For example, the downlink shared channel message is transmitted via a PDSCH.

Upon receipt of the DL shared channel message at step C-4, the decoder 411 at step C-5 is configured to decode RAR in the received shared channel message by using the determined location of the RAR in the corresponding DL shared channel message, so as to acquire a Temporary C-RNTI from one of the RARs.

After the Temporary C-RNTI is acquired by the decoder 411 at step C-4, the RF processing unit 45 of the communication device 4 at step C-6 is configured to monitor a downlink radio link for one or more downlink RF signals for receipt of a second downlink control channel message transmitted by the base station, via the air interface. For example, the second downlink control channel message is transmitted by the macro cell eNodeB via a PDCCH.

At step C-7, the decoder 411 is further configured to blindly decode DCIs in common search space and user-specific search space of the received second common downlink channel message by using the acquired Temporary C-RNTI so as to acquire scheduling information from the second downlink control channel message transmitted by the eNodeB 10. For example, the second downlink control channel message is transmitted by the macro cell eNodeB 10 via a PDCCH.

In an embodiment of the present disclosure, the communication device 4 is part of the small cell eNodeB 21 separate from the macro cell eNodeB 10 in the other cell overlapped with the cell of the base station. From FIG. 12, it is clearly seen that the cell of the small cell eNodeB 21 is overlapped with the cell of the macro cell eNodeB 10.

In an alternative embodiment, the communication device 4 is incorporated with the other base station in the other cell overlapped with the cell of the base station. For example, the communication device 4 can be incorporated with another small cell eNodeB 22.

Either the small cell eNodeB 21 or eNodeB 22 includes a base station client located at the other cell and a base station server 20 located at a remote site distant from both the cell of the macro cell eNodeB 10 and the other cell of eNodeB 21 or the eNodeB 22.

As also illustrated in FIG. 12, the base station server 20 is connected to multiple downlink base station clients, such as the small cell eNodeB 21, 22, 23, 24, 25 which are deployed in overlapped cell coverage of the macro cell eNodeB 10.

The step of blind decoding DCIs in the UE-specific search space of the received second common downlink channel message by using the acquired Temporary C-RNTI may include: determining by the decoder 411 a starting CCE index in the user-specific search space of the received second downlink control channel message according to the acquired Temporary C-RNTI.

After acquiring scheduling information of the UE in the received second downlink control channel message by using the acquired Temporary C-RNTI, the method may further include: determining the acquired Temporary C-RNTI by the information extractor 413 to be a C-RNTI assigned to the UE by the macro cell eNodeB 10.

After determining the acquired Temporary C-RNTI by the information extractor 413 to be a C-RNTI assigned by the macro cell eNodeB 10, the method may further include:

outputting by the information output 419 the acquired scheduling information in association with the determined C-RNTI of the UE to a memory for storage, in order to identify the acquired scheduling information as the acquired scheduling information of the UE.

After determining the acquired Temporary C-RNTI by the decoder 411 to be a C-RNTI assigned by macro cell eNodeB 10, the method may further include: outputting by the information output 419 the acquired scheduling information to the base station server 20 for storage, in order to identify the acquired scheduling information as the acquired scheduling information of the UE.

After determining the acquired Temporary C-RNTI to be a C-RNTI assigned by the base station, the method may further include: acquiring other scheduling information of the UE by the information extractor 413 which uses the determined C-RNTI in one or more downlink control channel messages subsequent to the received second downlink channel control message.

In an embodiment of the present disclosure, after determining the acquired Temporary C-RNTI to be a C-RNTI assigned by the eNodeB 10, the proposed method may further include: repeating steps C-1 to C-7 for the other UE within the cell of the eNodeB 10. For example, the communication device 4 can acquire C-RNTI by using the previously mentioned steps C-1 to C-7 and store the C-RNTI in the storage unit 42 and then use the acquired C-RNTI to acquire scheduling information from the PDCCH messages for a UE 111. Communication device 4 can then also follow steps C-1 to C-7 in the next TTI to acquire C-RNTI of another active UE within the radio service coverage of the eNodeB 10, for example a UE 112, and acquire the scheduling information from the PDCCH messages transmitted by the eNodeB 10. The communication device 4 follows the same procedures in steps C-1 to C-7 to acquire the RA-RNTI first, acquire the Temporary C-RNTI, and finally acquire the scheduling information assigned to all UEs by the macro cell eNodeB 10.

The preceding exemplary embodiments of the present disclosure may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a communication device shown in FIGS. 4 and 10. A computer-readable medium may include a computer-readable storage medium (e.g., a physical device) that may be any media or means that can carry or store the instructions for use by or in connection with a system, apparatus, or device, such as a computer or a communication device. For instance, the memory unit 42 may include the computer-readable medium which may include computer program code, when executed by the processor unit 41, may cause the communication device and related methods/approaches to acquire scheduling information from a neighbouring macro cell eNodeB to perform procedures/steps illustrated in FIG. 6 and FIG. 11.

Further aspects of the communication device 4 will be apparent from the above description of the communication device 4. Persons skilled in the art will also appreciate that any of the methods described above could be embodied in program code. The program code could be supplied in a number of ways, for example on a tangible computer readable medium, such as a disc or a memory or as a data signal.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method executed by a communication device for acquiring scheduling information transmitted from a base station located in a cell covering the communication device, the method comprising:
   determining, by the communication device, a set of candidate random access radio network temporary identities (RA-RNTIs);
   receiving, by the communication device, a first downlink control channel message transmitted by the base station, via an air interface;
   attempting to blind decode, by the communication device, downlink control information (DCI) bits in common search space in the received first downlink control channel message by using each RA-RNTI in the determined set of candidate RA-RNTIs, so as to determine a location of random access response (RAR) corresponding to an active user equipment (UE) in a corresponding downlink shared channel message;
   receiving, by the communication device, the corresponding downlink shared channel message transmitted by the base station, via the air interface;
   decoding, by the communication device, the RAR in the received downlink shared channel message by using the determined location of the RAR so as to acquire a temporary cell random access radio network temporary identity (TC-RNTI) from one of the RARs in the received downlink shared channel message;
   receiving, by the communication device, a second downlink control channel message transmitted by the base station, via the air interface;
   blind decoding downlink control information (DCI) in common search space and user-specific search space of the received second downlink control channel message by using the acquired TC-RNTI, so as to acquire scheduling information transmitted by the base station.

2. A method as claimed in claim 1, wherein the first and second downlink control channel messages are transmitted via a physical downlink control channel (PDCCH).

3. A method as claimed in claim 1, wherein the corresponding downlink shared channel message is transmitted via a physical downlink shared channel (PDSCH).

4. A method as claimed in claim 1, wherein the DCI being decoded by the communication device is of DCI format 1A or of DCI format 1C.

5. A method as claimed in claim 1, wherein the scheduling information is for Time Division Duplex (TDD) communication, and the step of determining a set of candidate RA-RNTIs comprises:

determining the set of candidate RA-RNTIs according to an equation (1):

$$RA\_RNTI = 1 + t\_id + 10 * f\_id \qquad \text{equation (1),}$$

wherein the t_id is the index of the first subframe of the specified physical random access channel (PRACH) and 0<=t_id<10, and f_id is the index of the specified PRACH within that subframe, in ascending order of frequency domain and 0<=f_id<6.

6. A method as claimed in claim 1, wherein the scheduling information is for Frequency Division Duplex (FDD) communication, and the step of determining a set of candidate RA-RNTIs comprises:
determining the set of candidate RA-RNTI according to an equation (2):

$$RA\_RNTI = 1 + t\_id \qquad \text{equation (2),}$$

wherein the t_id is the index of the first subframe of the specified physical random access channel (PRACH) and 0<=t_id<10.

7. A method as claimed in claim 1, further comprising:
attempting to use each RA-RNTI in the determined set of candidate RA-RNTIs to demask cyclic redundancy code (CRC) encoded in the DCI until the CRC is successfully demasked, so as to decode the DCI and determine the location of the RAR corresponding to the active UE in the corresponding downlink shared channel message.

8. A method as claimed in claim 1, wherein the communication device is part of another base station in another cell overlapped with the cell of the base station.

9. A method as claimed in claim 8, wherein the another base station comprises a base station client located at the another cell and a base station server located at a remote site distant from both the cell and the another cell.

10. A method as claimed in claim 9, wherein the base station server is connected to multiple downlink base station clients.

11. A method as claimed in claim 1, wherein the communication device is incorporated with the another base station in the another cell overlapped with the cell of the base station.

12. A method as claimed in claim 11, wherein the another base station comprises a base station client located at the another cell and a base station server located at a remote site distant from both the cell and the another cell.

13. A method as claimed in claim 12, wherein the base station server is connected to multiple downlink base station clients.

14. A method as claimed in claim 1, wherein the step of blind decoding DCIs in the user-specific search space of the received second downlink control channel message by using the acquired TC-RNTI comprises:
determining a starting common control element (CCE) index in the user-specific search space of the received second common downlink control channel message according to the acquired TC-RNTI.

15. A method as claimed in claim 1, wherein after the step of acquiring scheduling information of the UE in the received second downlink control channel message, the method further comprises:
determining the acquired TC-RNTI to be a C-RNTI assigned to the UE by the base station.

16. A method as claimed in claim 15, wherein after the step of determining the acquired TC-RNTI to be a C-RNTI assigned to the UE by the base station, the method further comprises:

outputting the acquired scheduling information in association with the determined C-RNTI to a memory for storage in order to identify the acquired scheduling information as the acquired scheduling information of the UE.

17. A method as claimed in claim 15, wherein after the step of determining the acquired TC-RNTI to be a C-RNTI assigned to the UE by the base station, the method further comprises:
outputting the acquired scheduling information to the base station server for storage in order to identify the acquired scheduling information as the acquired scheduling information of the UE.

18. A method as claimed in claim 15, wherein after the step of determining the acquired TC-RNTI to be a C-RNTI assigned to the UE by the base station, the method further comprises:
acquiring other scheduling information of the UE by using the determined C-RNTI in one or more downlink control channel messages subsequent to the received second downlink control channel message.

19. A communication device for acquiring scheduling information transmitted from a base station located in a cell covering the communication device, the communication device comprising:
a decoder configured to determine a set of candidate RA-RNTIs;
a radio frequency (RF) processing unit connected to the decoder and configured to receive a first downlink control channel message transmitted by the base station, via an air interface;
the decoder further configured to attempt to blind decode DCI in common search space in the received first downlink control channel message by using each RA-RNTI in the determined set of candidate RA-RNTIs so as to determine a location of RAR corresponding to a UE in a corresponding downlink shared channel message;
the RF processing unit further configured to receive the corresponding downlink shared channel message transmitted by the base station via the air interface;
the decoder further configured to decode the RAR in the received downlink shared channel message by using the determined location of the RAR so as to acquire a TC-RNTI from one of the RARs in the received downlink shared channel message;
the RF processing unit further configured to receive a second downlink control channel message transmitted by the base station via the air interface;
the decoder further configured to blind decode DCIs in common search space and user-specific search space of the received second downlink control channel message transmitted by the base station by using the acquired TC-RNTI to acquire scheduling information.

20. A communication device as claimed in claim 19, wherein the first, and second downlink control channel messages are transmitted via a PDCCH.

21. A communication device as claimed in claim 19, wherein the downlink shared channel message is transmitted via a PDSCH.

22. A communication device as claimed in claim 19, wherein when the scheduling information is for TDD communication, the decoder is configured to determine the set of candidate RA-RNTI according to an equation (1):

$$RA\_RNTI = 1 + t\_id + 10 * f\_id \qquad \text{equation (1),}$$

wherein the t_id is the index of the first subframe of the specified PRACH and 0<=t_id<10, and f_id is the index of the specified PRACH within that subframe, in ascending order of frequency domain and 0<=f_id<6.

23. A communication device as claimed in claim 19, wherein when the scheduling information is for FDD communication, the decoder is configured to determine the set of candidate RA-RNTI according to an equation (2):

$$RA\_RNTI = 1 + t\_id \qquad \text{equation (2),}$$

wherein the t_id is the index of the first subframe of the specified PRACH and 0<=t_id<10.

24. A communication device as claimed in claim 19, wherein the communication device is part of another base station in another cell overlapped with the cell of the base station.

25. A communication device as claimed in claim 19, wherein the communication device is incorporated with the another base station in the another cell overlapped with the cell of the base station.

26. A communication device as claimed in claim 20, wherein after the information extractor acquires the scheduling information of the UE in the received second downlink control channel message by using the acquired TC-RNTI, the information extractor is configured to determine the acquired TC-RNTI to be a C-RNTI assigned to the UE by the base station.

27. A communication device as claimed in claim 26, further comprising:
an information output connected to the information extractor and configured to output the acquired scheduling information in association with the determined C-RNTI of the UE to a memory for storage in order to identify the acquired scheduling information as the acquired scheduling information of the UE.

28. A communication device as claimed in claim 26, further comprising:
an information output connected to the information extractor and configured to output the acquired scheduling information to a base station server for storage, in order to identify the acquired scheduling information as the acquired scheduling information of the UE, wherein the base station server manages the another base station.

* * * * *